(12) United States Patent
Teal et al.

(10) Patent No.: US 6,484,827 B2
(45) Date of Patent: *Nov. 26, 2002

(54) DRIVE AND STEER VEHICLE

(75) Inventors: Richard Donald Teal, Horicon;
Eugene Gary Hayes, Beaver Dam;
David Lewis Marchese, Pewaukee;
Barry Joseph Goebert, Beaver Dam,
all of WI (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/769,674

(22) Filed: Jan. 25, 2001

(65) Prior Publication Data

US 2001/0011610 A1 Aug. 9, 2001

Related U.S. Application Data (62) Division of application No. 09/280,113, filed on Mar. 26, 1999.

(51) Int. Cl.⁷ .................................................. B62D 6/00
(52) U.S. Cl. ...................................... 180/6.2; 180/6.24
(58) Field of Search ........................... 180/6.24, 6.3, 180/6.32, 6.34, 6.48, 6.2, 305, 307

(56) References Cited

U.S. PATENT DOCUMENTS

| | | | |
|---|---|---|---|
| 2,336,911 A | 12/1943 | Zimmermann | 180/9.2 |
| 3,371,734 A | 3/1968 | Zaunberger et al. | 180/6.44 |
| 3,395,671 A | 8/1968 | Zimmerman, Jr. | 115/1 |
| 3,450,218 A | 6/1969 | Looker | 180/6.44 |
| 3,530,741 A | 9/1970 | Charest | 74/675 |
| 3,901,339 A | 8/1975 | Williamson | 180/6.48 |
| 4,471,699 A | 9/1984 | Seaberg | 74/687 |
| 4,718,508 A | 1/1988 | Tervola | 180/6.44 |
| 4,759,417 A | 7/1988 | Wanie et al. | 180/6.34 |
| 4,776,236 A | 10/1988 | Gleasman et al. | 74/720.5 |
| 4,790,399 A | 12/1988 | Middlesworth | 180/6.2 |

(List continued on next page.)

FOREIGN PATENT DOCUMENTS

| | | |
|---|---|---|
| EP | 0 806 337 A1 | 12/1997 |
| JP | 2000-25637 | 1/2000 |
| JP | 2000-25638 | 1/2000 |
| JP | 2000-25639 | 1/2000 |
| WO | WO 98/32645 | 7/1998 |
| WO | WO 00/01569 | 1/2000 |
| WO | WO 00/19127 | 4/2000 |

OTHER PUBLICATIONS

Popular Science, Tanks and dozers turn on a dime with new all–gear steering, relevant pp. 60, 61 and 62, date of publication Jul. 1985, published in U.S.A.

The Engineer, Tank–Steering Mechanisms, relevant pp. 337, 338, 339 and 340, date of publication Mar. 3, 1967, published in U.S.A.

(List continued on next page.)

*Primary Examiner*—J. J. Swann
*Assistant Examiner*—L. Lum (57) ABSTRACT

A vehicle such as a front engine tractor is adapted to utilize conventional steering and propel controls with a drive and steer type transmission. The transmission permits the vehicle to be driven and steered through its rear wheels, thereby permitting it to turn about one wheel and/or about an axis between its wheels. A substantial portion of the engine weight is carried on the vehicle frame forwardly of the transmission. Front castered wheels enable the vehicle to be easily steered by the drive wheels. A conventional type steering wheel is provided with a mechanical linkage extending between it and the transmission. Conventional type controls are also provided to propel or power the vehicle in a forward or rearward direction and within a range of speeds. With conventional type steering and propel controls adapted to be utilized with the drive and steer type transmission, operation of spin-turn vehicles is made simple and more efficient as well as reducing the time required to learn to operate and maneuver the vehicle.

34 Claims, 5 Drawing Sheets

U.S. PATENT DOCUMENTS

| | | | |
|---|---|---|---|
| 4,813,506 A | 3/1989 | Smtih | 180/6.44 |
| 4,883,137 A | 11/1989 | Wanie et al. | 180/6.34 |
| 4,895,052 A | 1/1990 | Gleasman et al. | 74/720.5 |
| 4,917,200 A | 4/1990 | Lucius | 180/6.2 |
| 4,969,533 A | 11/1990 | Holm et al. | 180/273 |
| 5,004,060 A | 4/1991 | Barbagli et al. | 180/6.44 |
| 5,042,338 A | 8/1991 | White, III et al. | 56/11.8 |
| 5,048,638 A | 9/1991 | Duncan et al. | 180/307 |
| RE34,057 E | 9/1992 | Middlesworth | 180/6.2 |
| 5,383,528 A * | 1/1995 | Nicol | 180/6.2 |
| 5,509,496 A | 4/1996 | Erickson et al. | 180/307 |
| 5,560,447 A | 10/1996 | Ishii et al. | 180/242 |
| 5,600,944 A | 2/1997 | Wright et al. | 56/14.7 |
| 5,644,903 A | 7/1997 | Davis, Jr. | 56/10.8 |
| 5,649,606 A | 7/1997 | Bebernes et al. | 180/30 |
| 5,706,907 A * | 1/1998 | Unruh | 180/6.66 |
| 5,722,501 A | 3/1998 | Finch et al. | 180/6.44 |
| 5,842,378 A | 12/1998 | Zellmer | 74/473.17 |
| 5,850,886 A | 12/1998 | Kouno et al. | 180/6.24 |
| 5,894,907 A | 4/1999 | Peter | 180/374 |
| 5,913,802 A | 6/1999 | Mullet et al. | 56/10.8 |
| 5,957,229 A * | 9/1999 | Ishii | 180/6.48 |
| 5,964,082 A | 10/1999 | Wright et al. | 56/14.7 |
| 5,984,031 A | 11/1999 | Velke et al. | 180/6.48 |
| 6,056,074 A * | 5/2000 | Heal et al. | 180/6.48 |
| 6,126,564 A * | 10/2000 | Irikura et al. | 475/24 |
| 6,257,357 B1 * | 7/2001 | Teal et al. | 180/6.2 |

OTHER PUBLICATIONS

Excel Industries Ind., U–T–R The Ultimate Turning Radius, relevant pp. 1–6, date of publication 1992, published in U.S.A.

Excel Industries Inc., Hustler 4000 Series, relevant pp. 1–8, date of publication 1995, published in U.S.A.

Woods Equipment Company, Woods Mow'N Machine, relevant pp. 1–12, date of publication 1997, published in U.S.A.

Exmark, Exmark Nobody Does It Better Professional Turf Care Equipment, relevant pp. 1–20, date of publication 1997, published in U.S.A.

Dixon Industries Inc., Dixon ZTR Riding Mowers, relevant pp. 1–4, date of publication 1997, published in U.S.A.

Shivvers Mfg., Zero Turn Radius Mower The Commercial Clipper, relevant pp. 1–4, date of publication 1997, published in U.S.A.

Ferris Industries Inc., The ProCut Z Zero–Turn Rider, relevant pp. 1–2, date of publication 1997, published in U.S.A.

Zipper–TS Mower, The Zipper–TS Mowers, relevant pp. 1–2, date of publication 1997, published in U.S.A.

Westwood, The Westwood Clipper Owners Instruction Manual, relevant pp. 1–19, date of publication unknown, believed to be published in Australia.

Electric Tractor Corporation, An Idea Whose Time Has Come, 5 pages, see specifically p. 2, date of publication—unknown, published in Ontario, Canada.

Electric Tractor Corporation, Model #9620, The Ultimate Lawn and Garden Tractor, 6 pages, date of publication—Jul. 27, 1998, published in U.S.A.

Farm Show Magazine, Battery–Powered Riding Mowe, 1 page, date of publication—Mar.–Apr. 1996, published in Canada.

English translation by Japanese Patent Office of Japanese publication 2000025637, date of publication—Jan. 25, 2000, 24 pages, title—Steering and Driving Device for Traveling Vehicle.

English abstract of Japanese Publication 2000025638 dated Jan. 25, 2000, one page, title—Steering and Driving Device for Traveling Vehicle.

English abstract of Japanese Publication 2000025639 dated Jan. 25, 2000, one page, title—Steering and Driving Device for Vehicle.

* cited by examiner

DRIVE AND STEER VEHICLE

CROSS REFERENCES TO RELATED APPLICATIONS

This is a division of application Ser. No. 09/280,113 filed Mar. 26, 1999, that application incorporated by reference in its entirety in this present application.

Four commonly owned and related patent applications have been filed concurrently with this patent application on Mar. 26, 1999, and their disclosures are intended to be fully incorporated by reference herein. They include "Lawn Tractor Vehicle", Ser. No. 09/277,351, "Steering Device for Drive and Steer Transmission", Ser. No. 09/277,418, "Effective Gear Reduction in Lawn Tractor Transmission", Ser. No. 09/277,344, and "Mechanism for Correct Steering in Reverse", Ser. No. 09/277,346, issued Oct. 10, 2000 as U.S. Pat. No. 6,129,164.

BACKGROUND OF THE INVENTION

1. Field of the Invention

The present invention relates to vehicles equipped with transmissions that enable their drive wheels to be separately powered to steer the vehicle and more particularly to small vehicles such as lawn and garden tractors equipped with such transmissions.

2. Description of the Related Art

It is known to provide small vehicles such as lawn mowing vehicles with hydrostatic motors for each drive wheel so that they can be powered individually. This permits the drive wheels to be powered forwardly and rearwardly in unison as well as at different speeds. Accordingly, the vehicle can be driven forwardly, rearwardly, steered by the drive wheels and turned about a vertical axis between the wheels. Vehicles equipped with such drive arrangements are sometimes referred to as having zero-turn or spin-turn capability.

Conventionally, the drive wheels have been controlled through separate hand levers. The hand levers serve to control both forward and reverse movement of each wheel as well as its speed. As the control lever is moved further forwardly or rearwardly of a neutral position, the speed increases. When one control lever is moved further from the neutral position than is the other lever, the vehicle turns since the speed of that wheel is increased relative to the other wheel. These types of hand controls require lengthy experience for an operator to become proficient in coordinating the forward speed and turning of the vehicle.

It is also known to provide large vehicles with transmissions that propel two drive wheels and individually steer each of them. These drive and steer type transmissions have taken the form of dual differential gear sets as well as planetary gear sets. They have been utilized primarily on tracked vehicles such as rice combines, tanks and skid-steer loaders. Recently, similar transmissions have become available in smaller configurations that provide for the wheel driving and steering functions to be controlled through separate input control devices. These devices permit forward, neutral and reverse propelling control for the two wheels with overriding control of each propelled wheel through a steering portion. With the advent of these transmissions, it would be desirable to adapt smaller vehicles such as lawn and garden tractors to utilize them. Further, it would be desirable to utilize forward, reverse and turn controls with which most individuals expected to use such vehicles would be familiar. Towards these ends, it would be desirable to utilize a conventional steering wheel with such transmissions as well as foot controls typically used with these vehicles. This would be particularly desirable since vehicles such as lawn and garden tractors are typically used infrequently, so that the operators would not be expected to develop the skills necessary for operating twin hand control levers. Therefore, it would be desirable to outfit a lawn and garden tractor with a steering wheel and foot controls for use with drive and steer type transmissions.

Such applications would provide a lawn and garden tractor with zero or drive and steer capability that would be more maneuverable around obstacles and in tight spaces since it could turn about an axis through its mowing unit or through itself. Further, productivity could be improved since the deck could be maneuvered to cut exactly where desired, thereby minimizing the movement of the deck over areas already cut. Additionally, it would be more comfortable and efficient for a new user to operate since they would most likely be familiar with the conventional steering wheels and foot controls used in lawn and garden tractors as well as automobiles.

SUMMARY OF THE INVENTION

Towards these ends, there is provided a vehicle such as a lawn and garden tractor which is adapted to utilize conventional steering and propel controls with a drive and steer type transmission. The transmission permits the vehicle to be driven and steered through its rear drive wheels, thereby permitting it to turn about one wheel and/or about an axis between its wheels. Front castered wheels enable the vehicle to be easily steered by the drive wheels.

A conventional type steering wheel is provided with a mechanical linkage extending between it and the transmission. Conventional type foot control pedals are also provided to propel or power the vehicle in a forward or rearward direction and within a range of speeds.

With conventional type steering and propel controls adapted to be utilized with the drive and steer type transmission, operation of spin-turn vehicles is made simple and more efficient as well as reducing the time required to learn to operate and maneuver the vehicle.

DESCRIPTION OF THE PREFERRED EMBODIMENT

Figure 1:
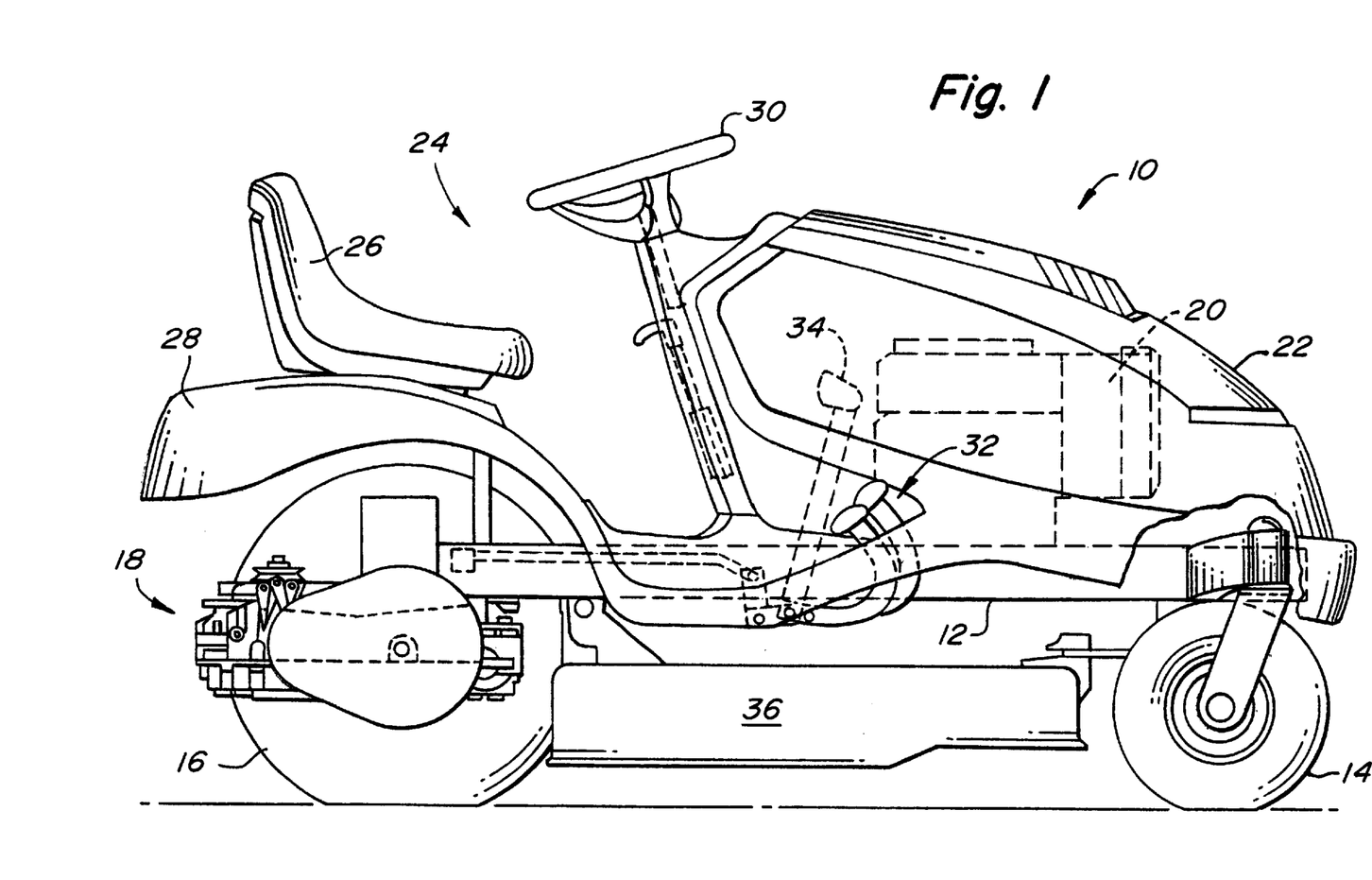
FIG. 1 illustrates a schematic side view of a lawn and garden type vehicle equipped with a dual differential type drive and steer transmission, a steering wheel and foot controls.

Looking first to FIG. 1, there is illustrated a schematic side view of a lawn and garden type vehicle 10 wherein the present invention is utilized. The vehicle 10 includes a frame 12 upon which front castered wheels 14 and rear drive wheels 16 are mounted, with a drive and steer type transmission 18 provided at the rear thereof. In the particular embodiment illustrated in FIG. 1, the transmission is a dual differential drive and steer type transmission. Further carried on the forward end of the frame 12 is an engine 20 as well as a downwardly and forwardly sloping hood structure 22 that encloses the engine 20. At the rear portion of the frame 12 is an operator station 24 with a seat 26 supported on a rear fender deck 28, a steering wheel 30, foot controls 32 and a parking brake 34. A mower deck 36 is supported beneath the frame 12 and between the front and rear wheels 14 and 16. Looking now to FIGS. 2 and 3, there is illustrated in schematic and perspective views the transmission 18, and steering and foot controls 38 and 40 for the vehicle of FIG. 1. The transmission 18 is a dual differential drive and steer type transmission having a forward drive portion 42 for propelling the wheels, as well as a rear steering portion 44 coupled with the forward drive portion 42. As is also schematically illustrated in FIGS. 2, 3 and 6, the drive and steering portions 42 and 44 each have a pair of laterally extending left and right axles 46 and 48 with the drive wheels 16 being supported on the axles 46 and 48. The left and right axles 50 and 52 of the rear steering portion 44 (See FIG. 6) are coupled with the respective left and right axles 46 and 48 of the driving portion 42 through gear arrangements that extend between each pair of left and right axles 46–50 and 48–52. A reversing gear 54 is provided between the right steering and drive axles 52 and 48 so that the left and right drive axles 46 and 48 are powered in opposite directions by the inputs from their respective steering axles 50 and 52.

Figure 2:
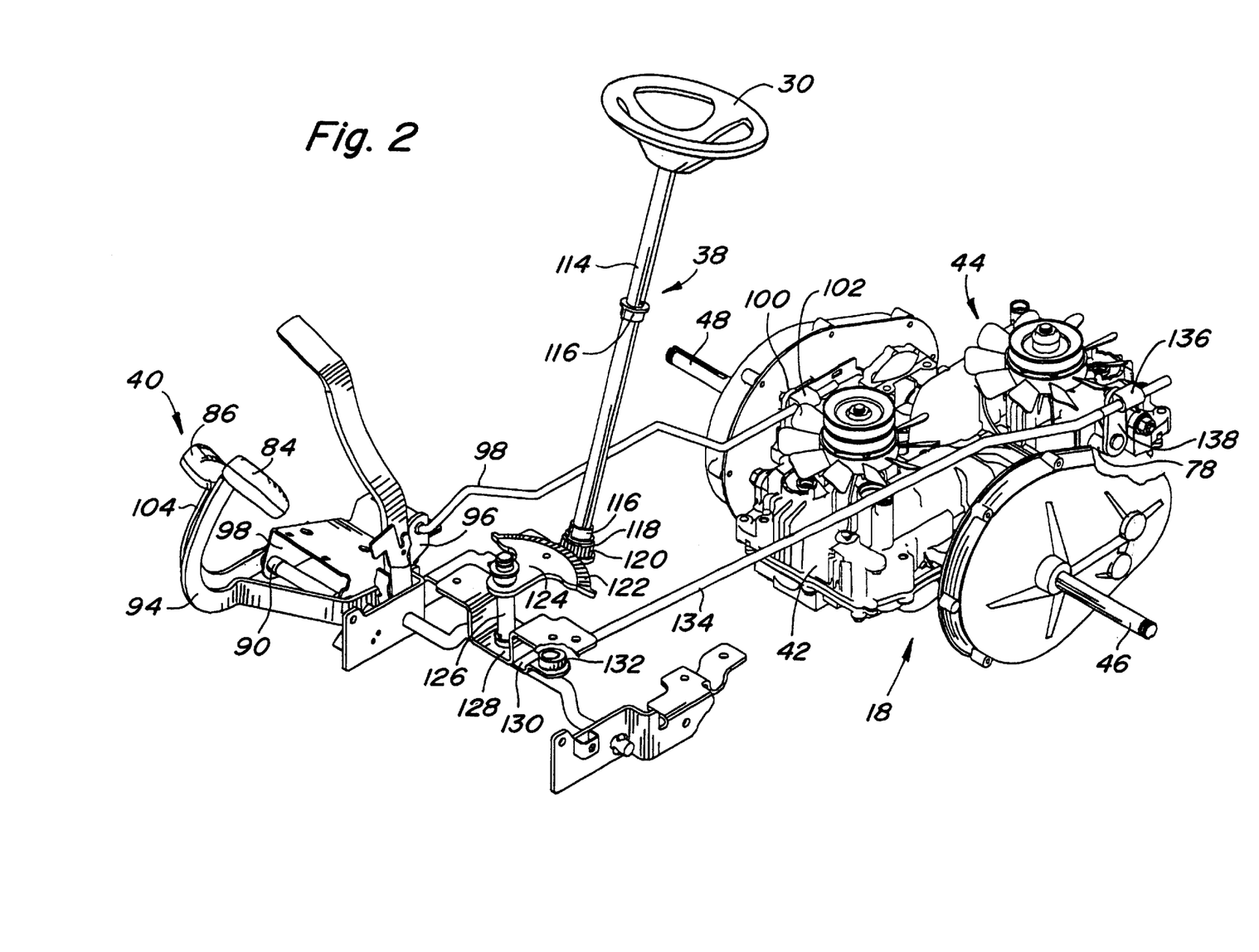
FIG. 2 illustrates a front elevated schematic perspective of the drive and steer type transmission and the steering and foot control assemblies.
Figure 3:
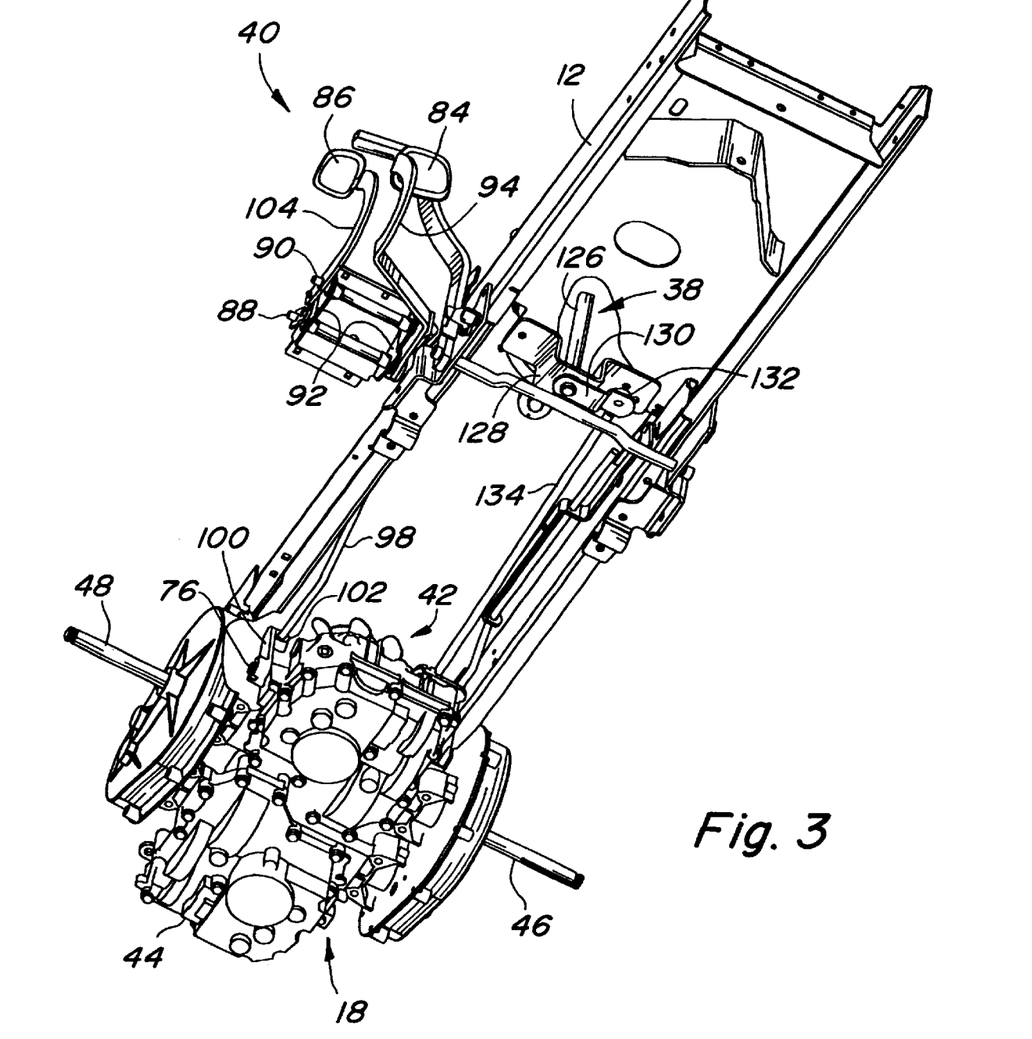
FIG. 3 illustrates a schematic view similar to FIG. 2, but taken from beneath the vehicle.
Figure 6:
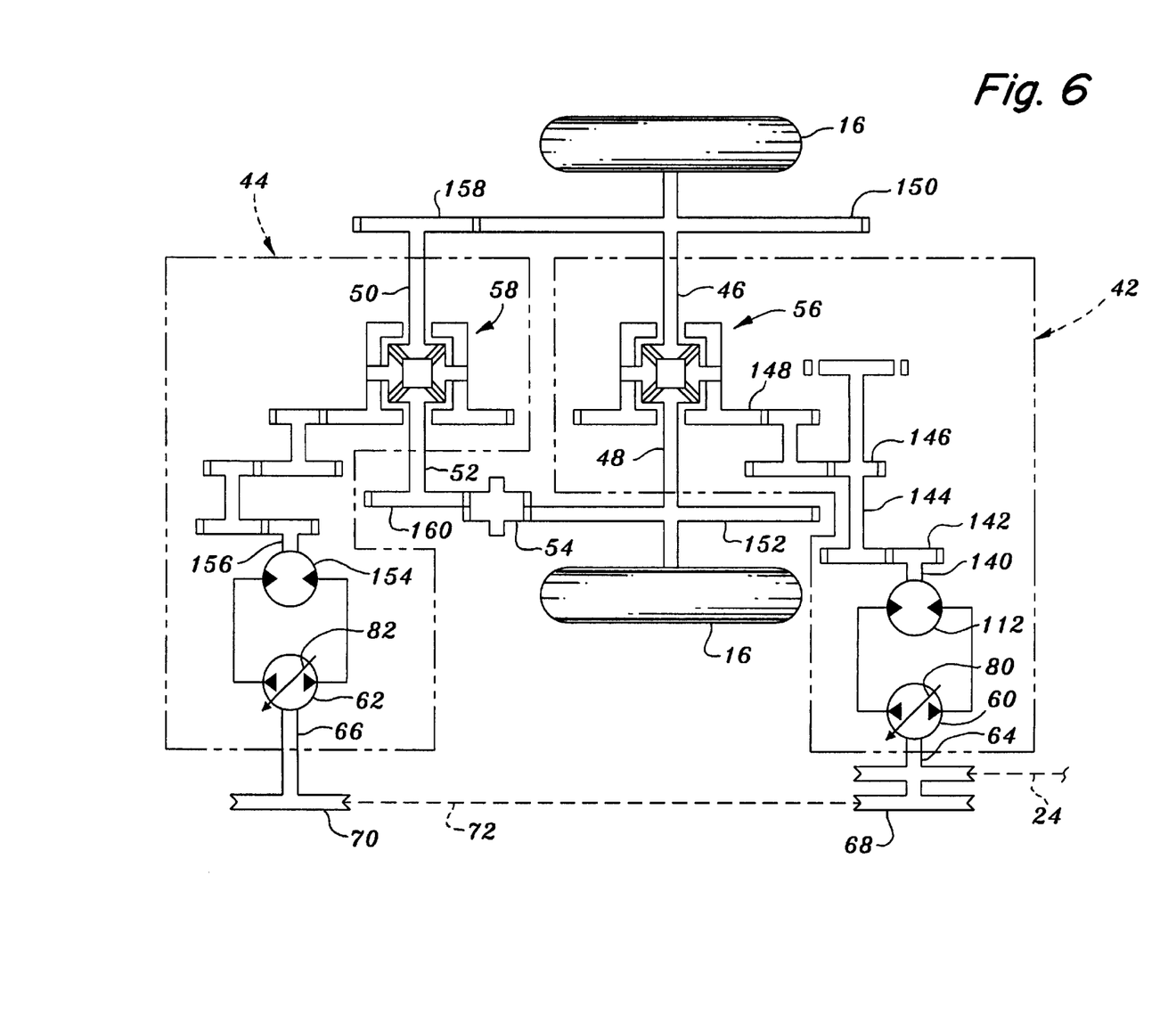
FIG. 6 illustrates a schematic view of the dual differential power train components.

Each of the drive and steering transmission portions 42 and 44 have separate hydraulic pump motor combinations for powering their differentials 56 and 58 and their respective axles 46–48 and 50–52. As shown in FIG. 6, the two hydrostatic pumps 60 and 62 are each powered through a respective input shaft 64 and 66. The shafts 64 and 66 are each powered by sheaves 68 and 70 which are rotatably driven by a V-belt 72. A second V-belt 74 driven by the drive shaft of the engine 20 is used to power the first pulley sheave 68. As best illustrated in FIGS. 2 and 3, each hydraulic pump 60 and 62 has its own swash plate control shaft 76 and 78. As shown in FIG. 6, the swash plate for the drive portion pump 60 is designated 80 while the swash plate for the steering portion pump is designated 82.

Figures 4, 5:
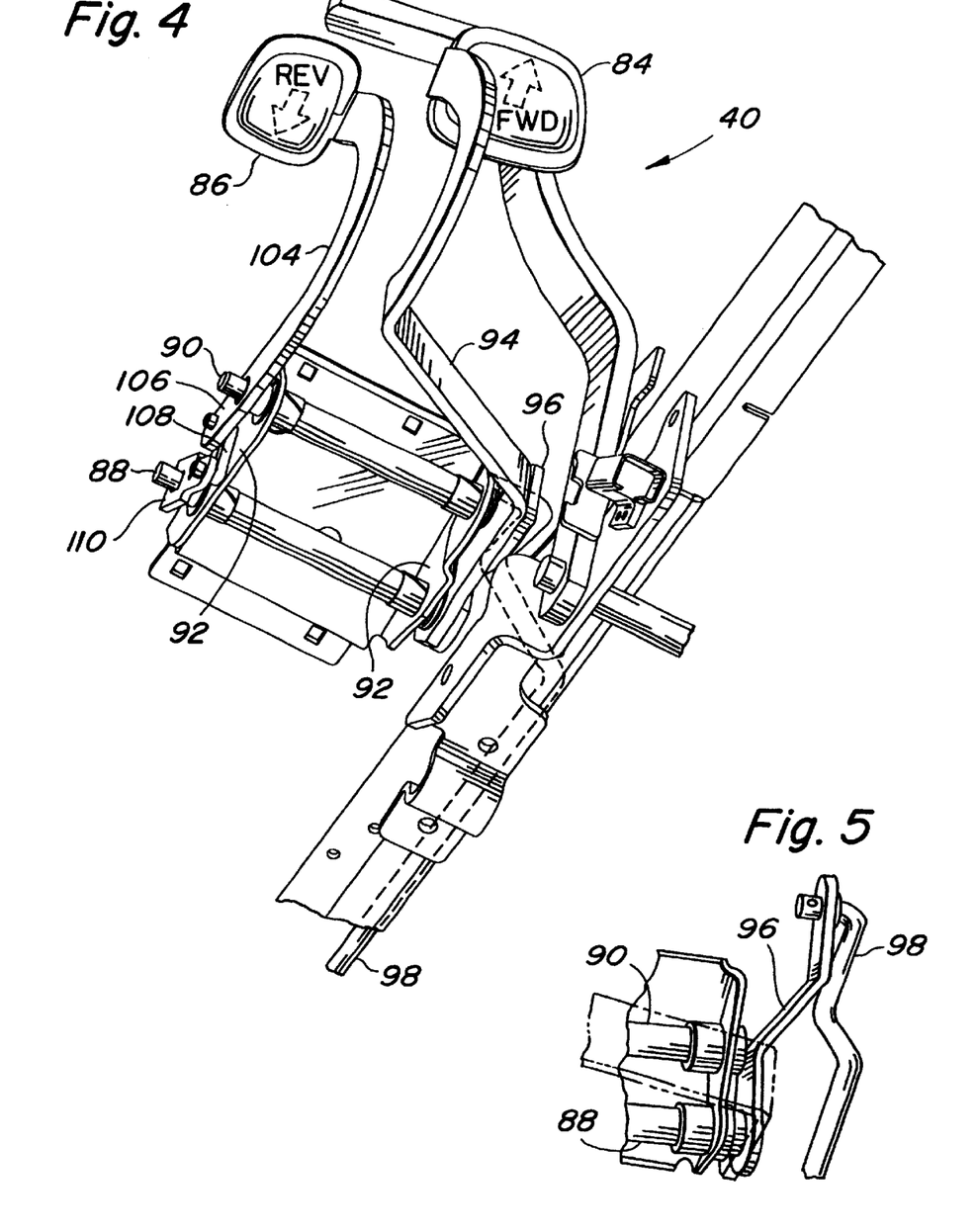
FIG. 4 illustrates an enlarged perspective view of the foot pedal arrangement shown in FIG. 3.
FIG. 5 illustrates a further enlarged view of the foot control lever arm and linkage shown in FIG. 4.

Looking as well to FIGS. 4 and 5, there is illustrated the foot pedal arrangement 40 for controlling the forward and reverse speed of the drive portion 42 of the transmission unit 18. This arrangement includes a forward pedal 84, as well as a reverse pedal 86. The pedals 84 and 86 are supported on respective first and second pivot shafts 88 and 90, which are carried on a set of brackets 92 supported by the frame 12 (see particularly FIG. 4). A single pedal, such as a treadle pedal arrangement mounted on a single shaft with a single push-pull linkage rod connected to the transmission unit 18 could also be utilized, if desired. The forward pedal 84 is mounted to a forward pedal arm 92 which is rigidly connected with the first or primary pivot shaft 88 for swinging movement. Additionally connected to the first shaft 88 is a control arm 96 (See FIG. 5) that swingably moves about the axis of the first pivot shaft 88 as the forward pedal 84 is depressed. The control arm 96 is in turn coupled with a linkage or propel rod 98 which extends between the control arm 96 and the swash plate lever 100 of the drive portion 42 of the transmission 18. The rod 98 is coupled with the swash plate control lever 100 through a universal or ball joint coupling 102 to accommodate the linear movement of the rod 98 and the swinging movement of the swash plate lever arm 100.

The foot pedal arrangement 40 further includes the reverse pedal 86 which is swingably supported on the secondary or second pivot shaft 90. The reverse pedal 86 is supported by an arm 104 which includes an extension 106 rearwardly of the secondary shaft 90. To the extension 106 is swingably coupled a reversing linkage consisting of a first link 108 and second link 110. The first link 108 is swingably coupled with the extension 106 while the second link 110 is rigidly coupled to the first pivot shaft 88. As the reverse pedal 86 is depressed, it swings about the secondary shaft 90 with its rear portion or extension 106 swinging in an upwardly arc. Accordingly, the reversing linkages 108 and 110 serve to rotate the primary shaft 88 in a counterclockwise direction as viewed in FIG. 4 as the reverse pedal 86 is depressed. As the primary shaft 88 is rotated in a counterclockwise direction, the control arm 96 rigidly mounted to it rotates rearwardly to shift the rod 98 rearwardly and swing the swash plate lever arm 100 in a rearwardly direction, thereby powering the pump 112 in a reverse mode.

Returning to FIGS. 2 and 3, there is illustrated the steering assembly 38 for controlling the steering unit 44 of the dual differential transmission 18. The steering assembly 38 includes the steering wheel 30 coupled for rotation with a steering shaft 114. While a conventional steering wheel is preferred, an elongated bar, tiller or similar structure adapted to rotate or be turned about an axis could be utilized. The steering shaft 114 is supported in upper and lower bushings 116 which are in turn carried by the frame 12. At the lower end of the steering shaft 114 is rigidly mounted a pinion 118 which has teeth 120 around its periphery. The teeth 120 are adapted to mesh with teeth 122 carried on a sector gear 124. The sector gear 124 is in turn rigidly mounted to a sector shaft 126 supported on a bracket 128 carried by the frame 12. The sector shaft 126 is adapted for swinging movement about a generally vertical axis to accommodate the rotational movement of the sector gear 124. Looking to FIG. 3, it can be seen that the lower end of the sector shaft 126 is rigidly mounted with a steering arm 130. The arm 130 swings in an arc as the sector shaft 126 is rotated by the sector gear 124. The steering arm 130 is secured to a universal type ball joint coupling 132 which receives a steering link or rod 134 that extends rearwardly and is received in a similar type of universal or ball joint coupling 136 at the top end of the steering pump swash plate control lever 138. The steering swash plate control lever 138 in turn is rigidly coupled with the steering pump swash plate control shaft 78 so that fore and aft movement of the steering rod 134 will swing the swash plate control lever 138 and adjust the swash plate 82 of the steering pump 62. Accordingly, as the steering wheel 30 is turned, the sector gear 124 is rotated and the steering arm 130 is swung in either a forward or rearward direction to pull or push the steering linkage 134 and adjust the swash plate 82 of the steering pump 62.

Looking now to FIGS. 2 and 6, the general operation of the dual differential drive and steer type transmission 18 will be reviewed. The dual differential transmission 18 includes the two separate hydrostatic differential transmissions, one 42 for propelling the driving wheels 16 and one 44 for steering those wheels 16. The separate cases for the two transmissions are depicted by the dotted lines enclosing each of them. The hydrostatic pumps 80 and 82 of both transmissions 42–44 are powered by the V-belt 72 which in turn is powered by the V-belt 74 coupled with the engine 20. As illustrated in FIG. 6, each pump 80–82 is driven by a respective input shaft 64–66 that is coupled with a respective V-belt pulley 68–70 driven by the engine V-belt 74. The hydraulic pump 80 of the propel unit 42 drives an hydraulic motor 112 which rotates an output shaft 140 and the associated gear 142. The gear 142 in turn transmits rotational power through shaft 144 and gear 146 to a ring gear 148 of the propel differential 56 to power the left and right axles 46 and 48 in the same direction. The left and right drive axles 46–48 are provided with gears 150–152 between the differential 56 and the wheels 16 mounted at the outer end portions of the axles 46–48. The adjustable swash plate 80 in the variably reversible pump 60 permits the direction of the axles 46–48 and their respective wheels 16 as well as their speeds to be adjusted.

The input shaft 66 of the steering unit 44 is coupled to a hydrostatic pump 62 which drives a steering motor 154. The output shaft 156 of the motor is coupled with the steering differential 58 to power the left and right steering axles 50–52 in the same direction. The left axle 50 of the steering unit 58 is provided with a large gear 158, while the right axle 52 is provided with a smaller gear 160 in the preferred embodiment. This smaller gear 160 is mounted to mesh with the reversing gear 54 provided on a separate shaft carried by the frame 12. The gears 158–150 on the left axles 50–46 of the steering and propel units 58–56 mesh to provide a direct drive between the two axles 50–46. The reversing gear 54 on the right side of the vehicle and the gear 152 on the right axle 48 of the propelling unit 56 also mesh to interconnect the two axles 48–52. In this manner, power to the steering differential 58 will rotate the axles of the left and right axles 50–52 of the steering unit 58 in the same direction. Rotational motion transmitted from the left axle 50 of the steering unit 58, through the gear 158, and to the gear 150 coupled with the left axle 46 of the drive unit 56 serves to drive the left axle 46 of the drive unit 56 in the opposite direction as the left axle 50 of the steering unit 58. The right axle 52 of the steering unit 58, which is coupled with the reversing gear 54, serves to drive the right axle 48 of the propel unit 56 in the same direction. Thus, the rotational motion imparted by the steering unit 58 to the left propel axle 46 as well as the right propel axle 48 is the same although in opposite directions. Accordingly, the left axle 46 is accelerated in one direction while the right axle 48 is accelerated in the reverse direction when the steering differential 58 is powered by the pump 154.

In operation, the vehicle 10 will operate as follows. The operator would utilize the steering wheel 30 and foot controls 40 in their conventional manner. The engine output shaft powers the drive belt 74 to rotate the pulleys 68 and 70 and input shafts 64–66 on the propel and steer transmissions 42–44, See FIG. 6. To move forward, the operator depresses the forward pedal 84, which rotates the forward pedal arm 98 and its linkage control arm 96. As the linkage control arm is moved forwardly, it pulls the propel linkage rod 98 forwardly and swings the swash plate control lever 100 forwardly. Accordingly, the hydrostatic pump 60 powers the propel motor 112 to power the differential 56, the left and right axles 46–48 and their attached wheels 16 in a substantially identical forward speed. Should the operator desire to propel the vehicle 10 in a rearwardly direction, he would depress the reverse pedal 86, and through the linkage best illustrated in FIG. 4, move the propel linkage control rod 98 in a reverse direction to swing the swash plate control lever 100 and the swash plate control shaft 76 in a reverse direction, thereby powering the hydrostatic pump 112 in a reverse manner to drive the propel differential 56 and their associated axles 46–48 and wheels 16 in a reverse and generally equal speed.

To steer the vehicle 10, the operator turns the steering wheel 30 which rotates the steering shaft 114. The teeth 120 on the pinion gear 120 engage the sector gear 124 to rotate the shaft 126. The steering arm 130 coupled to the sector shaft 126 is swung to either pull or push the steering linkage rod 134 and move the steering swash plate 82 forwardly or in reverse. As the swash plate 82 is moved, hydrostatic fluid is diverted to the steering motor 154 to drive the steering differential 58 and power the left and right axles 50 and 52. The gear 158 on the left side of the steering axle 50 drives the gear 150 of the left propel axle 46 to power it in one direction while the reversing gear 54 between the right axle 52 of the steering unit 44 and the right axle 48 of the propel unit 42 powers the right axle 48 of the propel unit 42 in a reverse and equal direction.

With the present arrangement, there is provided familiar steering and foot control assemblies for actuating the dual differential drive and steer type transmission. The caster wheels 14 provided at the forward end of the vehicle 10 permit it to swing easily in one direction or the other as the drive wheels 16 are propelled at incrementally different speeds to execute turns of the vehicle.

Alternately, a planetary gear type transmission could be utilized in place of the dual differential type transmission. With such a transmission, separate electric, hydraulic or other power inputs could be provided to propel the wheel axles and provide steering inputs to one of the planetary gear sets, as for example, the ring gear sets. Accordingly, the steering wheel and its related linkage would be coupled with the steering input while the foot controls and their related linkage would be coupled with the propel input.

We claim:

1. A vehicle including:

a frame;

an operator station carried by the frame;

left and right drive wheels;

left and right axles operatively connected with the respective left and right wheels;

a transmission carried by the frame and operatively driven by the power source, said transmission including a wheel driving portion and a wheel steering portion,
  the wheel driving portion being operatively connected with the left and right wheels and having a first control device shiftable between forward, neutral and reverse positions to drive said wheels at a plurality of speeds in forward and reverse directions,
  said steering portion being operatively connected with the left and right wheels and having a second control device shiftable between forward, neutral and reverse positions to power one of said wheels in a first direction and the other wheel in an opposite direction so as to change their relative speeds and execute vehicle turns;

a power source carried by the frame with a substantial portion thereof being carried forwardly of the transmission;

a first foot control mechanism operatively connected with the first control device for shifting it between its forward, neutral and reverse positions and drive said wheels; and a steering wheel carried by the frame and operatively connected with the second control device for enabling the operator to shift it between its forward, neutral and reverse positions and change the relative speeds of the left and right wheels to execute vehicle turns.

2. The invention defined in claim 1 wherein the power source is an engine which is carried on the forward portion of the frame and the transmission is carried on the rearward portion of the frame.

3. The invention defined in claim 1 wherein the wheel driving and steering portions are each provided with a pump and motor and the pumps respectively include the first and second control devices.

4. The invention defined in claim 1 wherein the foot control mechanism includes first and second foot pedals operatively connected with the first control device, said pedals being respectively shiftable to move the first control device between its forward and reverse positions.

5. The invention defined in claim 4 wherein the first and second foot control pedals are mounted to swing forwardly in an arc as they respectively shift the first control device.

6. The invention defined in claim 5 wherein the first control device includes a propel lever arm which is shiftable between first and second positions as the first control device is moved from its forward to its reverse position and a propel linkage is provided between the pedals and the propel lever arm.

7. The invention defined in claim 6 wherein forwardly swinging movement of the first foot pedal shifts the propel linkage forwardly to shift the propel lever arm forwardly.

8. The invention defined in claim 7 wherein a reversing linkage is provided between the first and second foot control pedals so that forward swinging movement of the second foot control pedal swings the first foot control pedal in a reverse direction and shifts the propel linkage rearwardly to in turn shift the propel lever arm to its reverse position.

9. The invention defined in claim 8 wherein the first and second foot control pedals are mounted to swing about fore and aft spaced pivot axes.

10. The invention defined in claim 6 wherein the wheel driving portion of the transmission includes a hydrostatic pump and motor, at least one of which includes the first control device with the propel lever arm being shiftable between a first forward position and a second rearward position.

11. The invention defined in claim 10 wherein the first control device is on the pump and includes a swash plate to which the propel lever arm is attached.

12. The invention defined in claim 11 wherein there is provided a universal coupling between the propel lever arm and the propel linkage.

13. The invention defined in claim 12 wherein the second control device includes a steering lever arm which is shiftable between first and second positions as the second control device is moved from its forward and reverse positions, and the mechanical linkage includes a steering link between the steering lever arm and the steering wheel, with said steering link being respectively moveable between first and second positions.

14. The invention defined in claim 13 wherein the mechanical linkage further includes a steering shaft to which the steering wheel is mounted, said steering shaft having a pinion gear mounted thereon that is engageable with a sector gear carried by the frame.

15. The invention defined in claim 14 wherein the sector gear is mounted for engagement with the pinion gear so that as the steering wheel is turned about its mounting with the shaft, the sector gear is swingably moved between first and second positions and there is further provided a steering arm between the sector gear and steering link that shifts the steering link between its first and second positions.

16. The invention defined in claim 15 wherein there is provided a universal coupling between the steering link and the steering arm.

17. The invention defined in claim 1 wherein a mechanical linkage extends between the steering wheel and the second control device.

18. A vehicle including:
  a frame;
  a power source carried by the frame;
  an operator station carried by the frame;
  left and right drive wheels;
  left and right axles operatively connected with the respective left and right wheels;
  a hydrostatic transmission carried by the frame and operatively driven by the power source, said transmission including a wheel driving portion and a wheel steering portion,
    the wheel driving portion being operatively connected with the left and right wheels and having a first control device shiftable between forward, neutral and reverse positions to drive said wheels at a plurality of speeds in forward and reverse directions,
    said steering portion being operatively connected with the left and right wheels and having a second control device shiftable between forward, neutral and reverse positions to power one of said wheels in a first direction and the other wheel in an opposite direction so as to change their relative speeds and execute vehicle turns;
  a power source carried by the frame with a substantial portion thereof being carried forwardly of the transmission and the operator station;
  a first foot control pedal mechanism operatively connected with the first control device for shifting it between its forward, neutral and reverse positions and drive said wheels; and
  a steering wheel carried by the frame and operatively connected with the second control device for allowing the operator to shift it between its forward, neutral and reverse positions and change the relative speeds of the left and right wheels to execute vehicle turns.

19. The invention defined in claim 18 wherein the power source is an engine which is carried on the forward portion of the frame and the transmission is carried on the rearward portion of the frame.

20. The invention defined in claim 18 wherein the wheel driving and steering portions are each provided with a pump and motor and the pumps respectively include the first and second control devices.

21. The invention defined in claim 18 wherein there is also provided a fore and aft extending steering rod which operatively interconnects the steering wheel and the second control device.

22. The invention defined in claim 21 wherein the steering wheel is mounted on the frame for rotational movement in a first and second direction, and is operatively interconnected with a sector gear to swingably move that gear in respective first and second directions as the wheel is rotatably moved between its first and second directions.

23. The invention defined in claim 22 wherein there is provided a control arm interconnecting the sector gear and the steering rod and movement of the sector gear in a first direction shifts the steering rod in a forward direction and movement of the gear in a second direction shifts the steering rod in a reverse direction.

24. The invention defined in claim 22 wherein there is further provided a steering shaft, a control arm and a steering rod with the steering wheel being coupled to the steering shaft for rotational movement between its first and second directions, the sector gear being carried by the frame and adapted to be engageable with the steering shaft and rotate in first and second directions as the steering shaft is rotated in its respective first and second directions, the control arm is coupled with the sector gear to be rotated in first and second directions as the sector gear is moved respectively in its first and second directions, and the steering rod extends between the control arm and the second control device to shift the second control device between its forward and reverse positions as the steering wheel is moved between its respective first and second directions.

25. The invention defined in claim 21 wherein the second control device includes a swash plate adapted for movement on a control shaft and the steering rod is coupled to the control arm to swingably move the control shaft and swash plate.

26. The invention defined in claim 25 wherein the swash plate is provided in the pump of the steering portion.

27. The invention defined in claim 25 wherein a universal coupling is provided between the steering rod and control shaft.

28. The invention defined in claim 18 wherein the foot control pedal mechanism includes a first foot pedal that is mounted on a first pivot axis for swinging movement and operatively connected to a fore and aft extending propel rod which is coupled with the first control device.

29. The invention defined in claim 28 wherein the first pivot axis extends generally laterally and the first foot pedal is operatively interconnected to the propel rod to shift the propel rod generally fore and aft.

30. The invention defined in claim 29 wherein there is a first pivot shaft through which the first pivot axis passes and the reversing linkage includes interconnecting first and second links, the first link being coupled with the second pedal and the second link being rigidly coupled with the first pivot shaft.

31. The invention defined in claim 28 wherein the foot control pedal mechanism includes a second foot pedal that is provided for swinging movement about a second pivot axis which is spaced from the first pivot axis and a reversing linkage interconnects the first and second pedals so that the forward swinging movement of the first pedal will shift the rod in a forward direction and a forward swinging movement of the second pedal will shift the rod in a reverse direction.

32. The invention defined in claim 28 wherein the first foot pedal is swingably coupled with a swing arm to which the propel rod is coupled.

33. The invention defined in claim 18 wherein the foot control pedal mechanism includes two foot pedals, one operatively connected with the first control device to move it to its forward position and the other operatively connected to the first control device to move it to its rearward position.

34. The invention defined in claim 18 wherein the steering wheel is operatively connected with the steering portion of the transmission through a mechanical linkage.

* * * * *